(12) United States Patent
Roberts

(10) Patent No.: US 7,097,098 B2
(45) Date of Patent: Aug. 29, 2006

(54) POINT-OF-SALE SYSTEM AND METHOD FOR PROCESSING PRODUCT-SPECIFIC INFORMATION AND ITEM-SPECIFIC INFORMATION

(75) Inventor: William Peyton Roberts, Spartanburg, SC (US)

(73) Assignee: Cryovac, Inc., Duncan, SC (US)

( * ) Notice: Subject to any disclaimer, the term of this patent is extended or adjusted under 35 U.S.C. 154(b) by 247 days.

(21) Appl. No.: 10/838,678

(22) Filed: May 4, 2004

(65) Prior Publication Data

US 2005/0247778 A1   Nov. 10, 2005

(51) Int. Cl.
*G06F 15/00* (2006.01)
*G06K 7/10* (2006.01)

(52) U.S. Cl. ............. 235/383; 235/462.01; 235/385; 705/23; 902/22

(58) Field of Classification Search ........... 235/383, 235/385, 462.13, 462.15, 462.14; 902/22, 902/37, 39, 40; 705/16, 21, 22, 23
See application file for complete search history.

(56) References Cited

U.S. PATENT DOCUMENTS

| | | | |
|---|---|---|---|
| 5,128,527 A * | 7/1992 | Kawai et al. .......... 235/462.15 |
| 5,198,649 A * | 3/1993 | Brooks .................. 235/462.15 |
| 5,478,990 A * | 12/1995 | Montanari et al. .......... 235/375 |
| 5,640,002 A | 6/1997 | Ruppert et al. |
| 5,724,244 A | 3/1998 | Yabuki |
| 6,018,719 A * | 1/2000 | Rogers et al. ................. 705/21 |
| 6,019,394 A | 2/2000 | Chenoweth et al. |
| 6,085,172 A | 7/2000 | Junger |
| 6,269,344 B1 | 7/2001 | Junger |
| 6,409,085 B1 * | 6/2002 | Gu .............................. 235/383 |
| 6,415,978 B1 | 7/2002 | McAllister |
| 6,550,685 B1 * | 4/2003 | Kindberg ............... 235/462.01 |
| 6,581,829 B1 * | 6/2003 | Kim ........................... 235/385 |
| 6,697,812 B1 | 2/2004 | Martin |
| 6,712,276 B1 | 3/2004 | Abali et al. |
| 2001/0011231 A1 | 8/2001 | Junger |
| 2001/0056359 A1 * | 12/2001 | Abreu .......................... 705/3 |
| 2002/0105424 A1 | 8/2002 | Alicot et al. |
| 2002/0133425 A1 | 9/2002 | Pederson et al. |
| 2002/0134834 A1 | 9/2002 | Otto |
| 2002/0165795 A1 | 11/2002 | Holley et al. |
| 2002/0169671 A1 | 11/2002 | Junger |
| 2002/0170961 A1 | 11/2002 | Dickson et al. |
| 2002/0188531 A1 | 12/2002 | Junger |
| 2003/0014267 A1 * | 1/2003 | Culp ............................. 705/1 |

(Continued)

OTHER PUBLICATIONS

Combating Counterfeit Drugs-13 A Report of the Food and Drug Administration, Feb. 18, 2004.

(Continued)

Primary Examiner—Jared J. Fureman
(74) Attorney, Agent, or Firm—Alston & Bird LLP

(57) ABSTRACT

The invention is a system and method of using a device that is communcatively disposed between a scanner and a conventional point-of-sale (POS) terminal. The device (IPDP) can be used to process and distinguish between product-specific information, such as a UPC bar code, and item-specific information, such as a serial number. The IPDP transfers product-specific information to the POS terminal where it is processed in a conventional manner. The item-specific information is transferred to a separate item-level processor that analyzes the data and communicates with an item-level database. The item-level database can be used to verify the specific item's authenticity, expiration date, warranty registration, and the like. As a result, the system can be used to help prevent counterfeiting.

27 Claims, 5 Drawing Sheets

U.S. PATENT DOCUMENTS

2003/0083944 A1    5/2003   Duvall et al.
2003/0177053 A1    9/2003   Otto
2003/0204409 A1   10/2003   Gorski et al.
2003/0213844 A1   11/2003   Yoshida et al.
2004/0032330 A1    2/2004   Hoffman
2004/0103037 A1*   5/2004   Wetmore et al. ............. 705/26
2004/0262391 A1*  12/2004   Harris et al. ................ 235/454
2005/0116033 A1*   6/2005   Moore ........................ 235/385

OTHER PUBLICATIONS

International Search Report from International Application No. PCT/US2005/015115 dated Jul. 11, 2005.

* cited by examiner

POINT-OF-SALE SYSTEM AND METHOD FOR PROCESSING PRODUCT-SPECIFIC INFORMATION AND ITEM-SPECIFIC INFORMATION

BACKGROUND OF THE INVENTION

The invention relates generally to retail point of sale systems, and more particularly, to the processing of data for goods having product level and item level identification codes.

The majority of retail stores are equipped with point-of-sale (POS) terminals that allow a retailer to quickly determine product-specific information from data that is encoded on an object. The code can be in the form of a bar code or other encoded symbols that are typically printed on the object.

Conventional POS terminals typically include an optical scanner, such as a bar code reader, and a terminal that is connected to a local network. At the POS, the retailer will typically scan the code with the bar code reader. Typically, the bar code is located on an item that can be a product or saleable good. The bar code reader can then either decode the data with a processor or decoder that is located within the scanner, or transfer the data to a separate terminal for decoding. The data is typically converted into a product-level identification that can be used to retrieve the price of the item from a local database. The local database is typically located within the retail store. Uniform product codes (UPC) are a form of bar codes that are widely accepted by retailers in North America. The above described POS system can be used in a wide variety of applications such as inventory tracking, inventory reordering, POS transactions, and the like.

Bar code readers and similar systems can also be useful for tracking item specific information that can be separately printed on various objects. In some cases, a single bar code may contain both product and item specific information. However, most conventional POS systems are not equipped to process additional data other than product-specific information such as a UPC code.

Radio frequency identification (RFID) systems are a more recent technology that are gaining greater popularity and use. RFID systems can be used to identify items by reading electronic information stored within tags or labels on the items. RFID systems have been used for a number of years in the tracking of packages and goods. However, RFID has not yet been widely accepted in the retail transaction market.

An RFID system is typically comprised of a transponder or tag, which is attached to the object that is to be identified, and a reader. The reader sends an electromagnetic signal to the tag and then detects a response. Typically, the reader emits a RF signal that is received by the transponder, after the transponder comes within an appropriate range. In response to the signal from the reader, the transponder sends a modulated RF signal back to the reader. The reader detects this modulated signal, and can identify the transponder by decoding the modulated signal. After identifying the transponder, the reader can either store the decoded information or transmit the decoded signal to a computer.

The transponder used in an RFID system may be either "passive" or "active." A passive transponder can be a simple resonant circuit, including an inductive coil and a capacitor. Passive transponders are generally powered by the carrier signal transmitted from the reader. Active transponders, on the other hand, generally include transistors or other active circuitry, and require their own battery source.

RFID tags can be used for storing and transmitting item-specific information. Item-specific information includes data that is specific to a particular item such as serial numbers, product registration information, expiration dates, and the like. RFID tags can store greater amounts of information than bar codes. As a result, there is virtually no practical limit on the amount of items that can be given their own unique identifier. Thus, electronic tags, such as RFID tags can help retailers verify authenticity of a particular item, which will help prevent counterfeiting.

Counterfeiting is of special concern in pharmaceutical drug manufacturing. In a recent report on counterfeiting, the FDA stated that counterfeiting poses a real public health and safety concern because the counterfeit drug products "may closely resemble, legitimate drugs yet may contain only inactive ingredients, incorrect ingredients, improper dosages, sub-potent, or super-potent ingredients, or be contaminated." (Combating Counterfeit Drugs, A Report of the Food and Drug Administration, Feb. 18, 2004). The report recognizes that RFID may offer a promising solution to help prevent counterfeiting, and that mass serialization to uniquely identify all drug products is the single most powerful tool that can be used to protect the U.S. drug supply.

Electronic product codes (EPC) are a unique numbering system that can be embedded within an electronic tag such as an RFID. EPC codes have the possibility to allow every company in the supply chain, including retailers, to track products at the individual item level. This means every single item on a shelf could be traced back to when it was made and when it is sold. EPC codes are typically produced and standardized by EPC global, which is an industry driven standardization group.

Currently, the vast majority of POS terminals are not equipped for processing both product-specific information and item-specific information, such as serial numbers that can be contained within RFID tags or other means such as bar codes. Under the current technology, retailers would typically have to change or upgrade the software and/or hardware within POS systems to accommodate RFID technology. Unfortunately, this could be an expensive undertaking that would typically require retailers to go back to the original POS vendor in order to upgrade the system. As a result, many retailers are reluctant to incorporate item-level identification associated with RFID technology into a conventional POS system until less expensive alternatives are available.

Thus, there exist a need for a system that can work in conjunction with existing conventional POS terminals so that they can process both product-specific information and item-specific information at a low cost and low complexity.

BRIEF SUMMARY OF THE INVENTION

The present invention provides a system and method whereby conventional POS terminals can be adapted to manage both product-level information and item-specific information. The system utilizes an item/product data processor device (IPDP) that is communicatively positioned between a scanner and a POS terminal. The IPDP separates product-specific information from item-specific information and transmits the product-specific information to the POS terminal where it can be processed conventionally. The item-specific information is transferred to a separate item-level processor. As a result, the IPDP allows a retailer to incorporate item-specific transaction data, such as RFID and other technologies into a conventional POS system without having to alter or upgrade the existing POS terminal.

The method of the invention includes the use of a conventional POS terminal and a data entry device, such as a scanner. At the point-of-sale, an item is scanned using the data entry device for both product-specific information and item-specific information. The scanned data is then transferred to the IPDP that processes the data and distinguishes between the data that is product-specific and the data that is item-specific. The product-specific information typically includes UPC bar codes and the like. The product-specific information is then transferred by the IPDP to the POS terminal in a recognizable format, where it is processed. The item-specific information is transferred to a separate item-level processor where the data can be processed and information that is specific to the particular scanned item can be retrieved or verified. Typically, the item-level processor communicates the serial number of the scanned item to an item-level database that can record the information, verify the serial number, verify expiration date of the item, and other similar operations.

The IPDP is designed so that it can be easily installed and used with existing conventional POS terminals. The IPDP will allow a retailer to process both conventional bar codes that contain product-specific information and bar codes and RFID tags that contain unique item-specific information, such as a serial number. As a result, the invention can help improve item tracking, authenticating items such as pharmaceuticals, assist in product registration, product returns, and the like, to name but a few.

Thus, the invention provides an innovative step in helping a retailer to process item-specific information without having to change or upgrade a conventional POS system.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The invention is a system that allows a conventional POS terminal to be used in a system that processes both product-specific information and item-specific information. The system incorporates an item/product data processor (IPDP) that can process both product-specific codes and item-specific codes without having to alter or upgrade the conventional POS terminal.

Product-specific information includes product identification codes that correspond to a type or class of products. Typical product-specific codes include, for example, UPC codes, European article numbering (EAN-13) codes, global trade item numbers (GTIN) codes, and the like. Product-specific codes are limited to a class of products and are not used to convey information about a particular item or object. Product-specific codes are typically used to track inventory, price, order status, and the like. Item-specific information on the other hand, contains item-specific codes that are particular to the specific item or object being scanned. As mentioned above, such codes can be used to transmit serial numbers, check authenticity, expiration dates, ownership status, and the like. Item-specific codes typically include item-specific identification codes such as electronic product codes (EPC). Each item can have a unique EPC code. Product-specific information and item-specific information includes information that can be in the form of a code or information that has already been decoded in a previous operation, for example by a data entry device such as a scanner.

Figure 1:
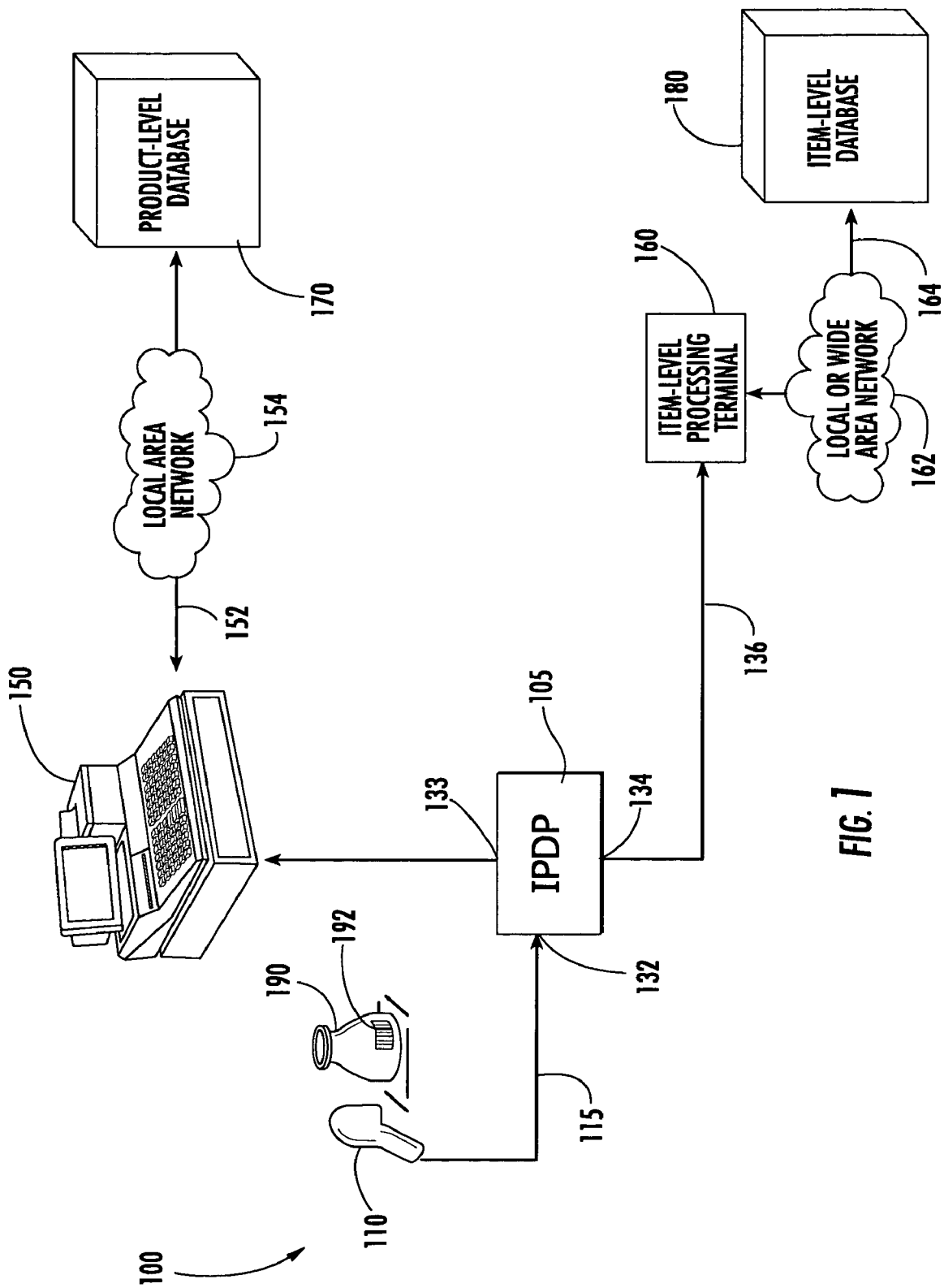
FIG. 1 is a schematic block diagram illustrating an example of a system for processing both product-specific information and item-specific information that incorporates a conventional POS terminal into the system.

With reference to FIG. 1, a system having an IPDP for processing both product-specific information and item-specific information is broadly designated with reference number 100. As shown in FIG. 1, system 100 includes a data entry device (scanner) 110 that reads or enters transaction data 192 from an object 190. The transaction data can contain product-specific information, item-specific information, or a combination of both. The data entry device 110 is operatively connected via connection 115 to the item/product data processor (IPDP) 105. The IPDP 105 can receive both product-specific information and item-specific information from a single or multiple data entry devices. IPDP 105 processes the data from the scanner 105 and can distinguish product-specific information from item-specific information.

The product-specific information can be transferred from the IPDP 105 to a point-of-sale terminal 150. At the POS terminal 150, the product-specific information (e.g., UPC code) is transferred to a local database 170 where associated product-specific information such as pricing can be transmitted back to the POS terminal 150.

When the IPDP 105 receives a combination of product-specific and item-specific information from the same object 190, it concatenates the product-specific information and the item-specific information to produce an item-level identification code that can be transferred from the IPDP 105 to a separate item-level processor 160. The data can then be transmitted to a separate network or database 180 where the item-specific information can be recorded and analyzed.

The IPDP 105 typically has an input 132 for receiving information from the scanner 110, a first output 133 for transferring processed data to the POS terminal, and a second output 134 for transferring processed data to the item-level processor. The input and outputs have connectors that are easily adaptable to accommodate a wide variety of different devices. The scanner is operatively connected to the IPDP in a wide variety of manners including, but not limited to, an internal network connection, such as a cable means, a wireless communication link using radio frequency (RF) equipment, cellular equipment, or infrared (IR) transmitters and receivers, internet connection that can be through an internal or external network, and the like. Similarly, the POS terminal and the item-level processor can be operatively connected to the IPDP and their respective databases through wired or wireless means, such as those described above. It should be recognized that the manner in which the operatively connected devices communicate is not critical to the invention, and that different methods of communicating information can be employed. The IPDP can have multiple inputs so that it is able to accommodate additional scanning devices.

Figure 2:
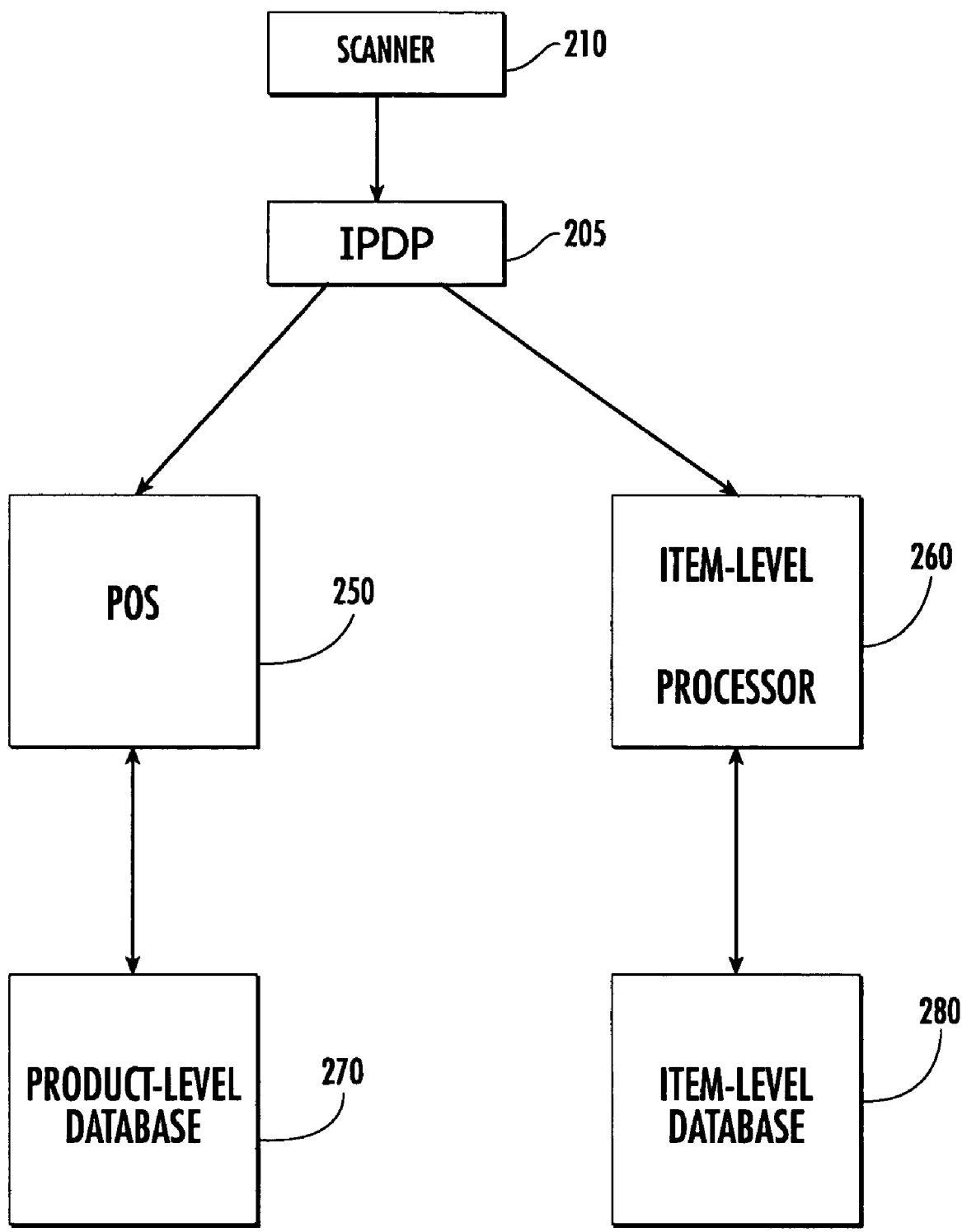
FIG. 2 is a flow chart of some of the main steps performed by a system that is in accordance with the invention.

With reference to FIG. 2, a flow chart representing the flow of transaction data through the system 100 is illustrated. As shown in FIG. 2, transaction data from an item or object is read or entered into the system using a data entry device 210, such as a scanner. The IPDP 205 then receives the transaction data from the scanner. The data transmitted to the IPDP can contain both product-specific information and item-specific information. The IPDP then processes the data to distinguish between the product-specific information and the item-specific information. The product-specific information is transferred from the IPDP 205 to a POS terminal 250. The POS terminal is typically operatively connected to a product-level database 270 which can contain the price for the product and can also record other data such as a record of the sale, inventory tracking, and the like. Typically, the POS terminal will communicate with the product-level database to retrieve the price of the product. The item-specific information is transferred, in the form of an item-level identification code, from the IPDP 205 to a separate item-level processor 260. The item-level processor 260 is typically operatively connected to an item-level database 280. The item-level database can be used to verify and record information regarding the specific item that was scanned. Such information typically includes item authenticity, serial number, sales records for the specific item such as date, price, and to whom the item was sold, product registration and warranty information, expiration date for the item, and the like.

After the data is transferred from the scanner 110 to the IPDP 105, the IPDP performs different operations on the transaction data depending upon the type of data that it receives. Exemplary operations are described below.

Figure 3:
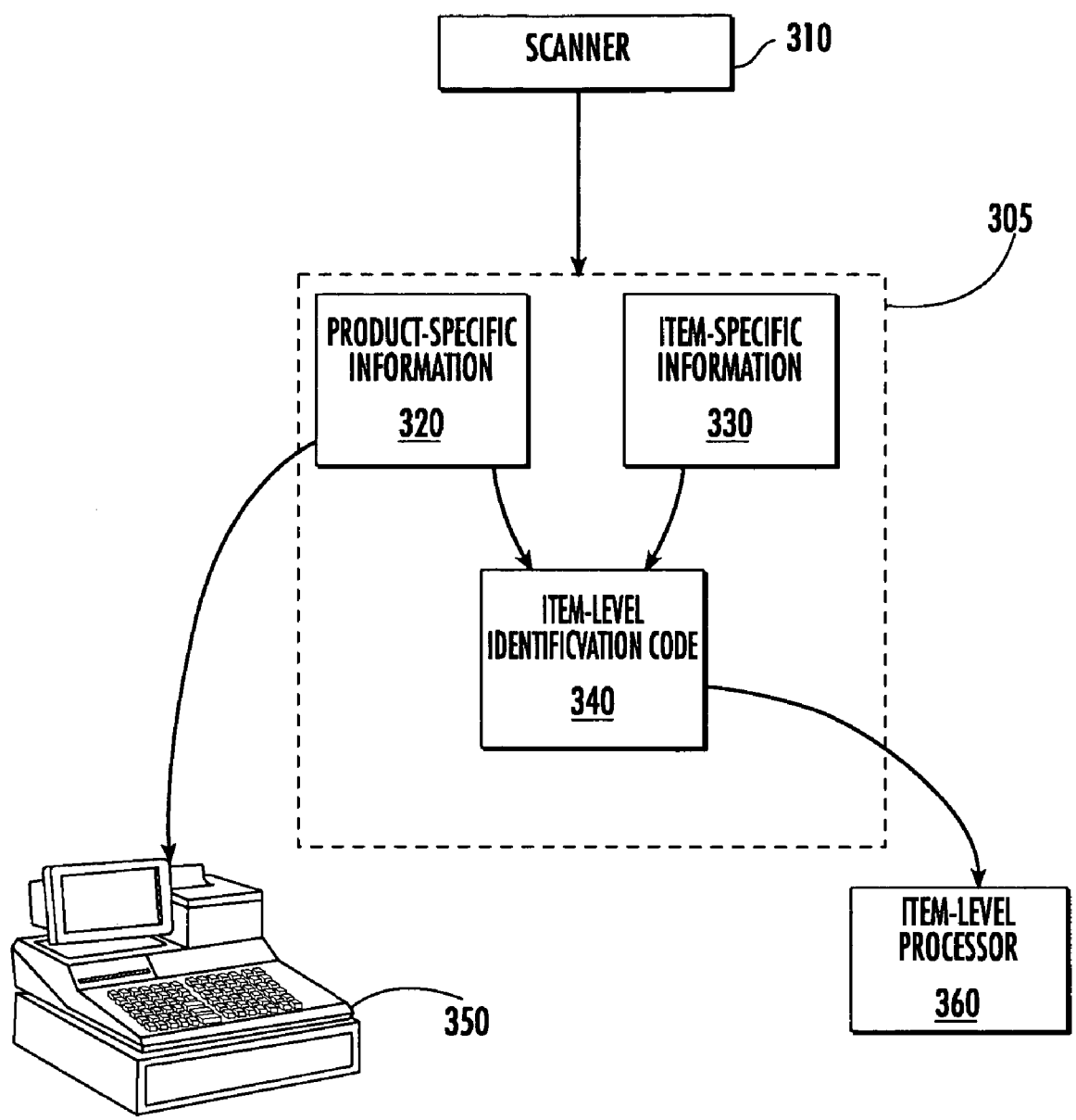
FIG. 3 is a flow chart representing the operations performed by the IPDP when it receives both product-specific information and item-specific information from the scanner.

If the transaction data received from the scanner includes both product-specific information and item-specific information within a pre-determined amount of time, the IPDP will pass the product-specific information to the POS terminal for further processing, and will construct an item-level identification code by performing a concatenation on the product-specific information and the item-specific information. Typically, the item-specific information is a code that is particular to the specific item, such as a serial number. The concatenated item-level identification code is then transferred to the item-level processor. In this regard, FIG. 3 is a flow chart that represents the IPDP receiving product-specific information 320 and item-specific information 330 from the scanner 310. The IPDP 305 transfers the product-specific information 320 to the POS terminal 350, and concatenates the product-specific information 320 and the item-specific information 330 to produce an item-level identification code 340. The IPDP 305 then transfers the item-level identification code 340 to the item-level processor 360. The pre-determined amount of time can be varied and modified depending upon such factors as the desired scanning interval and improving efficiency at the POS. The order in which the product-specific and item-specific information is scanned and transferred to the IPDP can be varied and is not critical to the practice of the invention.

Figure 4:
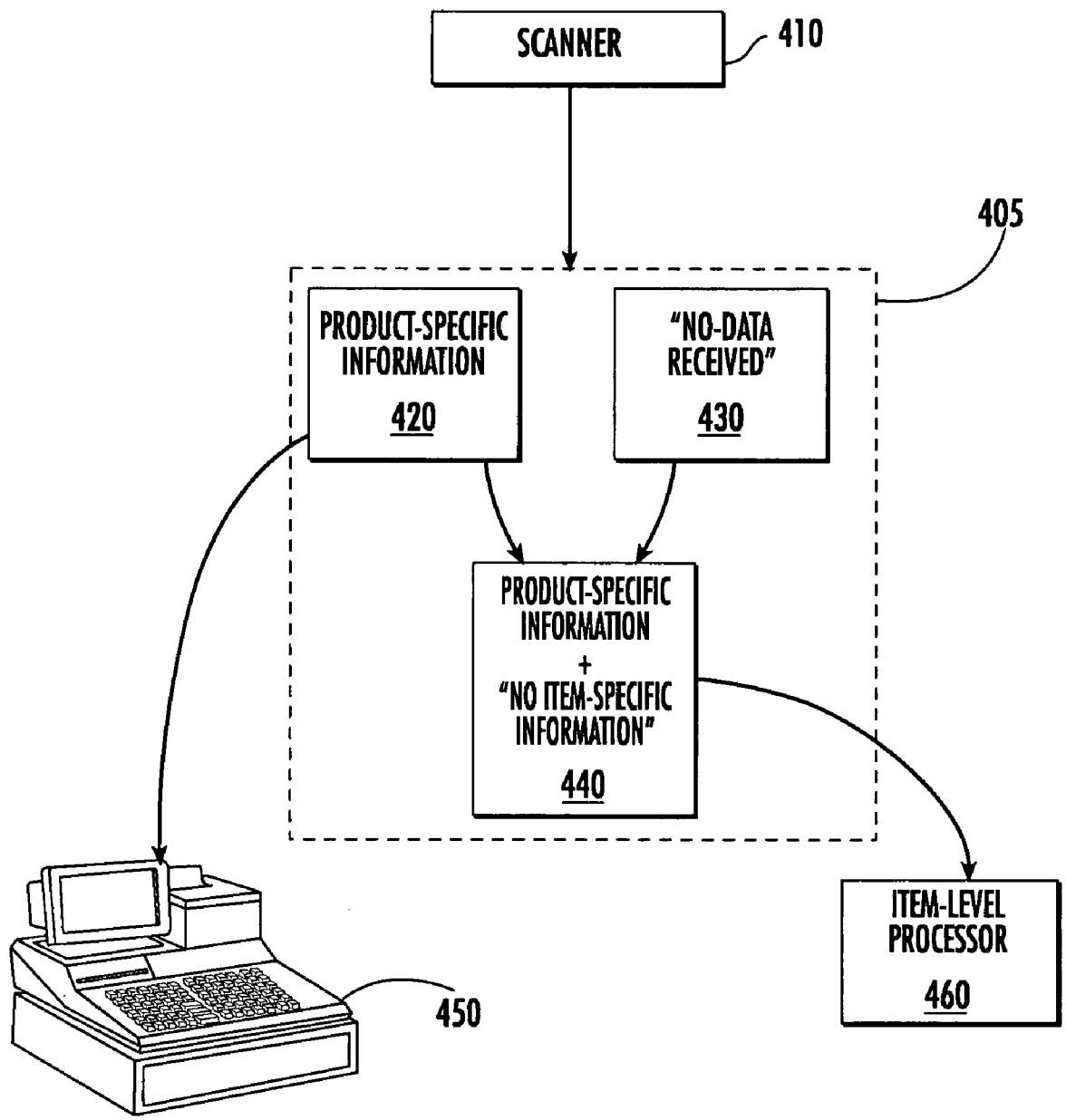
FIG. 4 is a flow chart representing the operations performed by the IPDP when it receives product-specific information and no item-specific information from the scanner.

If the IPDP receives only product-specific information within the pre-determined amount of time, or product-specific information is accompanied by a code signifying "no item-specific information," then the IPDP will make the determination that there is no item-specific information available and will pass the product-specific information to the POS terminal. The IPDP will also pass the product-specific information+"no item-specific information" concatenated code to the item-level processor. In this regard, FIG. 4 is a flow chart that represents the IPDP 405 receiving product-specific information from the scanner and no item-specific information. The IPDP then transfers the product-specific information 420 to the POS terminal 450, while at the same time concatenating an item-specific identification code 440 that includes the product-specific information and the designation "no-serial number." Code 450 is then transferred to the item-level processor 460.

Figure 5:
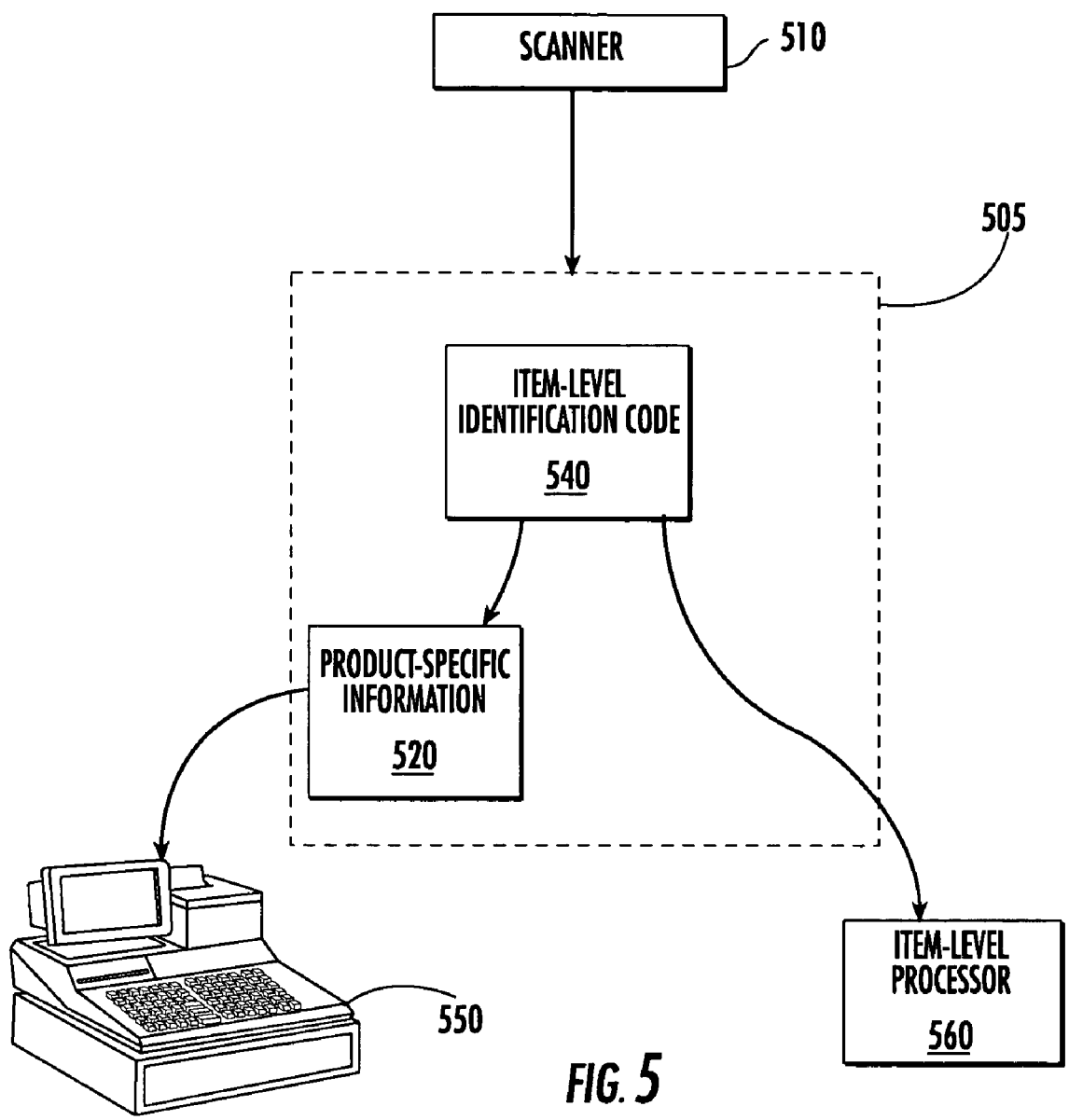
FIG. 5 is a flow chart representing the operations performed by the IPDP when it receives an item-level identification code from the scanner.

If the IPDP receives an item-level identification code directly from the scanner, as, for example, from scanning an RFID tag, magnetic stripe, or bar code, the IPDP will transfer the item-level identification code directly to the item-level processor. The IPDP will then perform a parsing operation on the item-level identification code to separate the item-specific information from the product-specific information. The product-level information is then transferred from the IPDP to the POS terminal for further processing. In this regard, FIG. 5 is a flow chart that represents the IPDP 505 receiving only an item-level identification code 540 from the scanner 510. The IPDP 505 then transfers the code 540 directly to the item-level processor 560, and performs an operation on the code 540 to separate the product-specific information 520 from the code 540. The product-specific information 520 is then transferred to the POS terminal 550 for further processing. It should be recognized that above described processes are exemplary methods of how the IPDP can process various forms of transactional data received from a scanner, and that the IPDP can perform additional and different operations to distinguish and process the product-specific information and the item-specific information.

The data entry device 110 is can be any type of device that can be used to enter or read data from an item and then transfer the data to the item/product data processor device (IPDP). Typically, the data entry device is a bar code scanner or RFID scanner. Other devices that could be used include, without limitation, keyboards, magnetic readers, scales, etc. Additionally, depending upon the type of code being read, the system may have more than one data entry device. For instance, a conventional system may be equipped with only an optical bar code scanner. If a retailer wants to process both bar code and RFID information it may be necessary to include a second scanner that can read an RFID signal. Alternatively, a single data entry device could be used that incorporates both an RFID and a bar code scanner. The scanner can be in the form of a handheld device that is in the shape of a wand or gun that can be pointed or waived at the bar code or RFID tag. Alternatively, the scanner can be placed in a horizontal or vertical position whereby the bar code or RFID signal can be read by passing the item over the scanner.

The POS terminal is typically a computer, cash register, or similar device that can process product-level identification such as a UPC bar code. Typically, the POS terminal is operatively connected to a local database that contains information that corresponds to product-level identification. The POS terminal can be connected to the local database in a wide variety of manners including, but not limited to, an internal network connection, such as a cable means, a wireless communication link using radio frequency (RF) equipment, cellular equipment, or infrared (IR) transmitters and receivers, and the like.

The local database is typically located within the retailer's premises. Typically one or more POS terminals are operatively connected and in communication with the local database. The local database can also be used in conjunction with single store retailers, such as a "Mom and Pop" operation or can be used to manage product data for larger, multiple store retailers. The local database could also be located at a more centralized location that could be used to manage inventory and pricing within a local geographical area. The local database can also be in communication with a centralized computer system that can be used to track inventory and sales for multiple stores.

An item-level processor is typically associated with each POS terminal, or alternatively, a retailer could use a single item-level processor that could be used to process item-specific information from multiple POS systems within the store. The item-level processor is typically in communication with an item-level database that is typically not located on the retail premises. The item-level processor can typically communicate with one or more item-level databases depending upon the particular item that has been scanned. For instance, if an item-specific identification code is generated for a potentially counterfeit item, such as a pharmaceutical drug, the item-level processor could communicate with the manufacturer's database to verify authenticity, expiration date, usage instructions, and the like. The database could also be used to update warnings, product recalls, and additional information. Alternatively, the item-specific processor can communicate with the item-level database in a batch method at pre-determined intervals, such as daily or weekly. In batch processing, the timing and volume of data transfers between each item-level processor and the item-level database can be managed more efficiently, but there is typically no opportunity to use information returned from the item-level database in processing each individual retail transaction.

The item-level database is typically used to verify and record information regarding a particular item or object. Retailers, manufacturers, distributors, etc. can maintain the item-level database(s), or they may be maintained by a separate data-hosting entity. As discussed above, the item-level database can be used for tracking, transmitting, and transferring data that is specific to the particular item that is scanned.

In one form of the invention, the system can be used for tracking the authenticity of goods, such as pharmaceuticals, expiration dates on perishable goods, serial numbers, product registrations, warranty information, prior sales, point of purchase, information of the purchaser, and the like. In a particularly useful form of the invention, an RFID tag, bar code tag or label can be placed on a pharmaceutical drug that can contain a unique identification code for the particular package. At the point-of-sale, the retailer can scan the package for both product-specific information and item-specific information. The tag or label can contain both item-specific information and product-specific information, or alternatively, the tag or label may contain only the item-specific information, and the product-specific information could be contained in a separate tag or label.

After the retailer has scanned the item to enter the data into the system, the data is transferred to and received by the IPDP. The IPDP will perform its operations and send the product-specific information to the POS terminal, and transmit the item-level identification code to the item-level processor. The item-level processor will typically communicate with an item-specific database, and if necessary, determine which item-specific database with which it should communicate. Typically, the item-level processor will submit sales transactional data, and/or in the case of a pharmaceutical product or other potentially counterfeit product, submit a query that requests authentication of the serial number. The item-level database will typically record the query and process the serial number to determine if the transaction should proceed. If the serial number is authenticated, the item-level database can transmit a response to the item-specific processor that would indicate whether the sale should or should not be completed. If for example, the expiration date has expired for the particular item, the item-specific database could transmit instructions to remove and recall particular batch numbers.

As should be evident from the above disclosure, the invention provides a simple and efficient method for upgrading conventional POS terminals so that they can be used in a system that can process both product-specific and item-specific information. It is envisioned that the system could be used in a wide variety of applications that range from the registration of electronic serial numbers to the authentication of pharmaceutical drugs.

Many modifications and other embodiments of the invention set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for processing transaction data obtained from a point-of-sale data entry device for transmission to a point-of-sale terminal equipped for processing product-specific information, said method enabling the data entry device to be used for also processing item-specific information, and said method comprising:
   receiving from the data entry device transaction data containing either item-specific information or product-specific information or both item-specific information and product-specific information;
   processing the thus-received transaction data to distinguish product-specific information from item-specific information;
   transferring transaction data containing the product-specific information to the point-of-sale terminal in a format recognizable by the terminal; and
   transferring transaction data containing the item-specific information to a separate item-level processor equipped for processing of item-specific information.

2. A method according to claim 1, wherein the transaction data received from the data entry device includes both item-specific information and product-specific information, and said step of processing the transaction data also includes generating a concatenated code for transfer to said item-level processor that contains the product-specific information and the item-specific information for that transaction.

3. A method according to claim 1, wherein the transaction data received from the data entry device includes only product-specific information, and said step of processing the transaction data also includes generating a concatenated code for transfer to said item-level processor that contains the product-specific information and a code indicating the lack of item-specific information for that transaction.

4. A method according to claim 1, wherein the transaction data received from the data entry device includes only item-specific information, and said step of processing the transaction data also includes generating product-specific information for transfer to the point-of-sale terminal based upon the item-specific information for that transaction.

5. A method according to claim 4, wherein said step of processing the transaction data also includes generating a concatenated code for transfer to said item-level processor that contains the thus-generated product-specific information and the item-specific information for that transaction.

6. A method according to claim 1, wherein the step of processing the item-specific information at the item-level processor also includes transferring the thus processed item-specific information to an item-level database.

7. A method according to claim 6, wherein the item-specific information includes a serial number.

8. A method according to claim 7, wherein the item-level database processes the serial number to record or verify at least one of the following selected from the group consisting of authenticity, expiration date, warranty registration, purchase verification, prior sales records, and product registration.

9. A method according to claim 1, wherein the point-of-sale terminal is in communication with a product-level database that contains product-level information such as price and inventory.

10. A method of using a point-of-sale terminal for verifying the authenticity of an item or product, said method comprising:
   reading transaction data for said item or product with a point-of-sale data entry device;
   receiving from the data entry device transaction data containing item-specific information and product-specific information;
   processing the thus-received transaction data to distinguish product-specific information from item-specific information;
   transferring transaction data containing the product-specific information to the point-of-sale terminal in a format recognizable by the terminal; and
   transferring transaction data containing the item-specific information to a separate item-level processor equipped for processing of item-specific information;
   communicating the item-specific information with an item-level database that is in communication with the item-level processor; and
   receiving authentication from the item-level database.

11. The method according to claim 10, wherein the item-specific information is a serial number.

12. The method according to claim 10, wherein the item-specific information is encoded in a bar code or RFID signal.

13. The method according to claim 10, wherein the item or product is a pharmaceutical product.

14. The method according to claim 13, wherein the authenticating the pharmaceutical product also includes verifying its expiration date.

15. A system for processing transaction data obtained from a point-of-sale data entry device for transmission to a point-of-sale terminal equipped for processing product-specific information, said system enabling the data entry device to be used for also processing item-specific information, and said system comprising:
   an input operatively connected to the data entry device for receiving therefrom transaction data containing either item-specific information or product-specific information or both item-specific information and product-specific information;
   a processor operatively connected to said input and operable for processing the transaction data to distinguish product-specific information from item-specific information;
   a first output operatively connected to said processor and adapted to be connected to the point-of-sale terminal for transferring transaction data containing the product-specific information to the point-of-sale terminal in a format recognizable by the terminal; and
   a second output operatively connected to said processor and adapted for transferring transaction data containing the item-specific information to a separate item-level processor equipped for processing of item-specific information.

16. A system according to claim 15, wherein said data entry device is a bar code scanner or RFID scanner, or combination thereof.

17. A system according to claim 16, wherein said data entry device includes a cord terminating in a connector adapted to be connected to a corresponding connector on the point-of-sale terminal, and wherein said input comprises a connector compatible with the connector of said scanner and said output comprises a connector compatible with the connector of said point-of-sale terminal.

18. A system according to claim 15, further including a second data entry device for transferring item-specific information to the input, and wherein product-specific information is transferred to the input with the first data entry device.

19. A system according to claim 18, wherein the first data entry device is an optical bar code scanner, and the second data entry device is a RFID scanner.

20. A system according to claim 15, wherein the transaction data received from the data entry device includes both item-specific information and product-specific information, and said processor includes means for generating a concatenated code for transfer to said item-level processor that contains the product-specific information and the item-specific information for that transaction.

21. A system according to claim 15, wherein the transaction data received from the data entry device includes only product-specific information, and said processor includes means for generating a concatenated code for transfer to said item-level processor that contains the product-specific information and a code indicating the lack of item-specific information for that transaction.

22. A system according to claim 15, wherein the transaction data received from the data entry device includes only item-specific information, and said processor includes means for generating product-specific information for transfer to the point-of-sale terminal based upon the item-specific information for that transaction.

23. A system according to claim 15, wherein the item-specific information is a serial number.

24. A system according to claim 15, wherein the data entry device and the point-of-sale terminal are operatively connected with wire or wireless means.

25. A system according to claim 15, further including an item-level database that is in communication with the item-level processor.

26. A system according to claim 15, wherein the point-of-sale terminal is in communication with a product-level database.

27. A system according to claim 26, wherein the product-level database includes records containing product-level pricing, inventory records, and product-level sales tracking.

* * * * *